Aug. 21, 1962 T. LANE 3,050,145
LIQUID WEIGH CELL
Filed Dec. 9, 1959 5 Sheets-Sheet 1

Trent Lane  Inventor

By Richard N. Nagel Attorney

Aug. 21, 1962  T. LANE  3,050,145
LIQUID WEIGH CELL
Filed Dec. 9, 1959  5 Sheets-Sheet 2

FIGURE 2

Trent Lane  Inventor

By Richard W. Nagel  Attorney

FIGURE 4

Trent Lane   Inventor

FIGURE 6

Trent Lane   Inventor

By Richard H. Nagel   Attorney

Aug. 21, 1962   T. LANE   3,050,145
LIQUID WEIGH CELL

Filed Dec. 9, 1959   5 Sheets-Sheet 5

FIGURE 7

Trent Lane   Inventor

By *Richard H. Nagel* Attorney

United States Patent Office 3,050,145
Patented Aug. 21, 1962

3,050,145
LIQUID WEIGH CELL
Trent Lane, Rte. 1, Baker, La.
Filed Dec. 9, 1959, Ser. No. 858,366
20 Claims. (Cl. 177—210)

This invention relates to a cell for weighing liquids. It relates particularly to a cell for weighing liquids wherein a spring-supported tank member loaded with the liquid to be weighed is continuously restored to a null position as its liquid loading changes. It relates still more particularly to such a cell for weighing liquids wherein restoration of said tank to its null position is effected according to signals generated by a strain transducer position detector, and it relates even still more particularly to a weigh cell system comprising a spring-supported tank member and a strain transducer position detector as aforesaid, and further including recording means whereby a continuous record may be taken of liquid weight loading within said tank.

In the apparatus embodiment of this invention the null position of the liquid-loaded, spring-supported tank mentioned above is maintained by a servo or balancing motor and worm and gear system which raises or lowers a plate supporting a compression spring whereon in turn the tank member itself is seated. Power to the balancing motor system comes immediately from a servo amplifier, and is controlled by signals from a strain transducer position detector as noted already. This transducer is sensitive to slight changes in vertical position of the tank member as it is loaded with or unloaded of liquid. The transducer continues to generate a signal causing energization of the balancing motor until the tank has been restored to its predetermined null position.

The null position weighing system has the property of balancing out all dead weights of the tank and its fittings by resilient supports. This leaves the tank floating on springs, and allows the weighing mechanism to measure only the weight change of the tank contents. In weighing systems presently known to the art which employ strain transducer elements, a direct measuring technique is employed wherein dead weight of the weighing apparatus takes up a large portion of the weight range otherwise potentially available. In such direct weighing systems it is at best not easy to make accurate measurements in the lower part of the available weight range, and very difficult indeed to make them when the liquid to be weighed is maintained under high pressure. In the liquid weigh cell of this invention the strain transducer is employed at its maximum sensitivity at all times while being used as a position detector only.

A strain transducer is not the only means whereby changes in position of a spring-supported tank may be detected. Other means include a differential transformer and a variable capacitor with an oscillator, and these means may be used with a null position weighing system. In comparison with the other named position detecting means for the service in question, however, the strain transducer has appreciable advantages. It requires fewer parts for its construction, and it is noted for its stability, particularly when used as a detector and working through only a small part of its designed force and/or displacement range.

The balancing motor which is energized according to strain transducer signals not only acts to restore the tank member of the liquid weigh cell of this invention to its null position, but also drives the sliding contact member of a helical potentiometer which is part of a battery-powered resistance network furnishing input voltage signals to a graphic recorder. Any movement of the balancing motor shaft moves the potentiometer sliding member to cause a voltage signal to be imposed on the recorder which is directly proportional to the motor shaft movement, and is also a function, most desirably a linear function, of the load or change of load of liquid in the weigh cell tank member. The mechano-electrical signal transmission system from the weigh cell tank member to the recorder by way of the spring support means of the tank, the balancing motor, and the helical potentiometer will be calibrated to give the desired millivolt signal or range of signals to the recorder so that divisions on the chart paper of the recorder will represent known weights.

The nature and substance of this invention may be more clearly perceived and fully understood by referring to the following description and claims taken in connection with the accompanying drawings in which:

Figure 1:
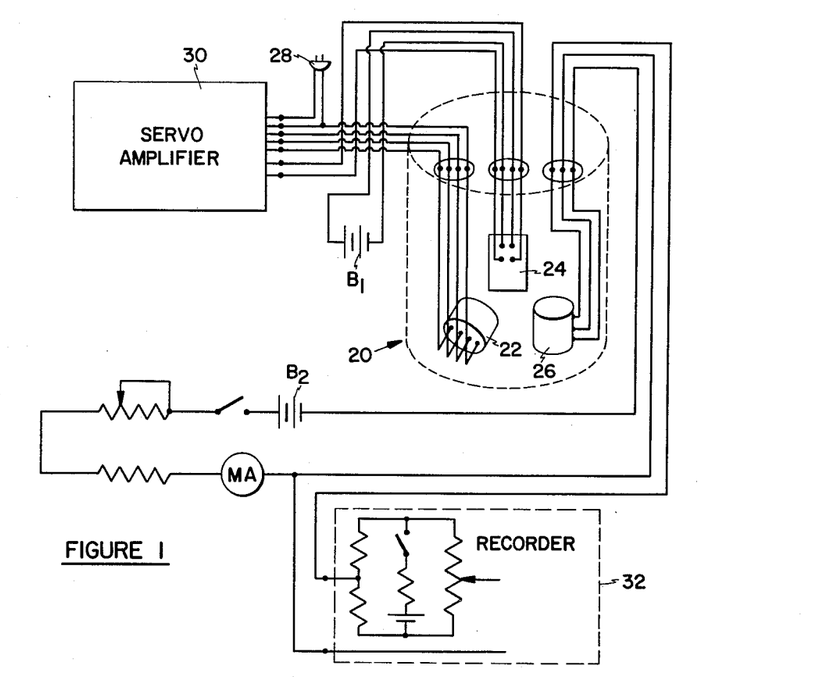
FIGURE 1 represents a schematic wiring diagram of the weigh cell of this invention.

Referring now to the drawings, particularly to FIGURE 1 thereof, the weigh cell unit assembly of this invention is generally designated 20. Components of this assembly include an induction motor 22, a strain transducer 24, and a helical potentiometer 26. The mechanical association of these components will be more clearly illustrated in subsequent figures.

Motor 22 is a brushless, variable speed machine which has two stator windings and which is sensitive to phase relation between the currents in these two windings. One winding is energized at all times by alternating current from a line source not shown which may be supplied through any standard connector 28. The other winding is energized by a current from servo amplifier 30. Depending upon whether the current from the amplifier leads or lags the line current, the output shaft of motor 22 will turn one way or the other. A motor suitable for use in weigh cell unit assembly 20 is Model RBT 2510 made by Holtzer-Cabot Co., Boston, Mass., for Leeds and Northrop Co., Philadelphia, Pa.

Strain transducer 24 is a 4-juncture resistance bridge assembly of a kind well known in the mechanical and electrical arts. As shown, this bridge is excited by a direct voltage from battery $B_1$. It may, however, also be excited by a 60-cycle signal (6.3 volts A.C.) from the power transformer of amplifier 30. The two output leads from the bridge are connected to servo amplifier 30. A strain transducer suitable for use in weigh cell unit assembly 20 is Model G1–1.5–300 made by Statham Instruments, Inc., Los Angeles, Calif. This transducer, as will be more clearly illustrated in subsequent figures, is a packaged assembly characterized by an extension member along which force and/or displacement may be applied.

Transducer Model G1–1.5–300 has a force range of ±1.5 oz. (push or pull), a displacement range of ±0.0015 in., an excitation requirement of 6.3–9.0 v. alternating or direct, a nominal bridge resistance of 300 ohms, a natural frequency of 250 c.p.s., and an approximate full scale open circuit output of ±20 millivolts. For a battery supply the polarity plus amplitude, or, in the case of an A.C. signal supply, the phase plus amplitude of the output signal from strain transducer 24 determines the phasing of the output current from amplifier 30 flowing through one of the stator coils of motor 22 with respect to line current flowing through the other stator coil. The polarity, or phase for A.C. excitation, of the output voltage signal from strain transducer 24 therefore determines the direction of rotation of motor 22. Servo amplifier 30 may be of any design well known to the electrical art suitable for performing the service indicated.

Helical potentiometer 26 is provided with a voltage across its resistor element by battery $B_2$ which is connected in an external circuit of suitable and conventional arrangement. This potentiometer may suitably be a 10 ohm or 100 ohm, 10-turn device. Leads from one side of the potentiometer resistor element and from its slider element are connected to graphic recorder 32. This recorder may be of any conventional form such as one using recording paper in roll form advanced by a clock mechanism or motor, and having a galvanometer or electronic mechanism which displaces a pen or stylus apparatus to mark on the paper according to the intensity of an impressed voltage or electromotive force signal.

It should be noted that the wiring diagram of FIGURE 1 includes two complete circuits. One of these is the circuit through induction motor 22, strain transducer 24 and servo amplifier 30. The other is the circuit through potentiometer 26 and recorder 32. These two circuits are electrically independent of each other. The association between their components is of a mechanical nature only in that motor 22 drives potentiometer 26 through suitable intermediate gearing. The nature of this association and motor drive will be more completely described in connection with succeeding figures.

Figure 2:
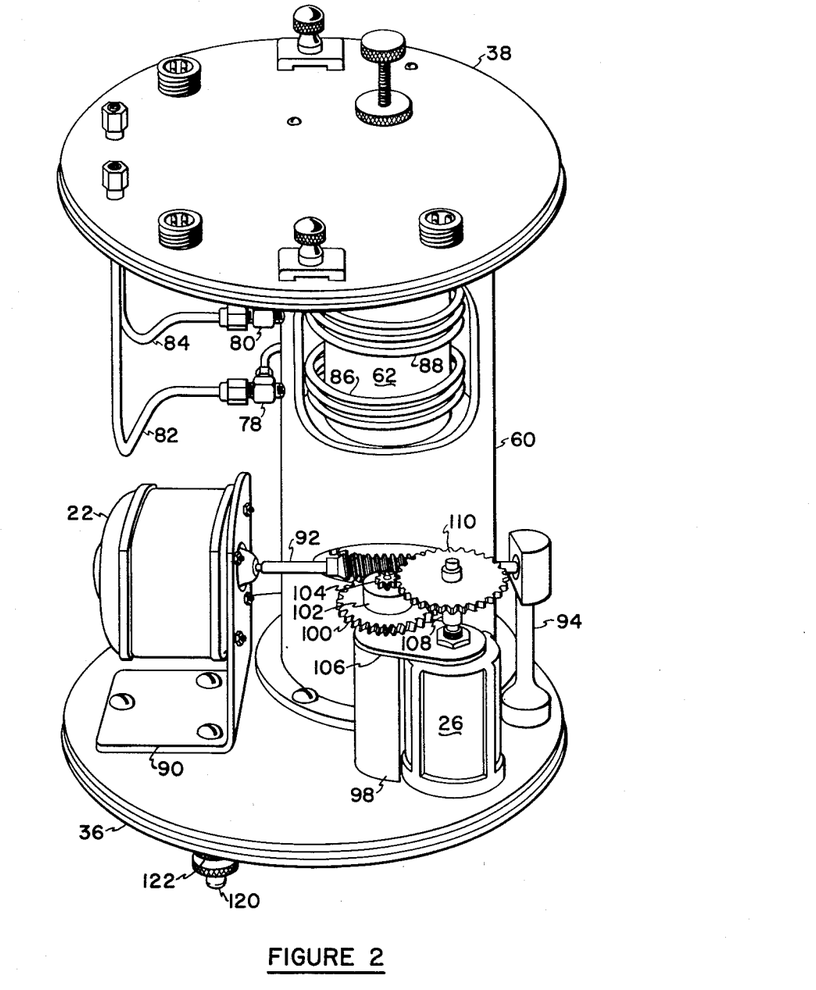
FIGURE 2 represents a perspective view from above the weigh cell unit assembly after removal of the outer shell member thereof, showing particularly the balancing motor, the helical potentiometer, and the weigh cell tank, but omitting the wiring connections.
Figure 3:
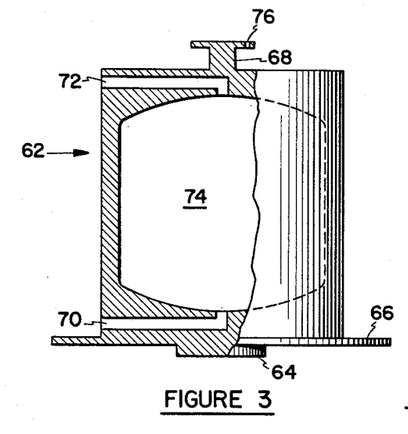
FIGURE 3 represents a side elevation view, partly in section, of the weigh cell tank.
Figure 4:
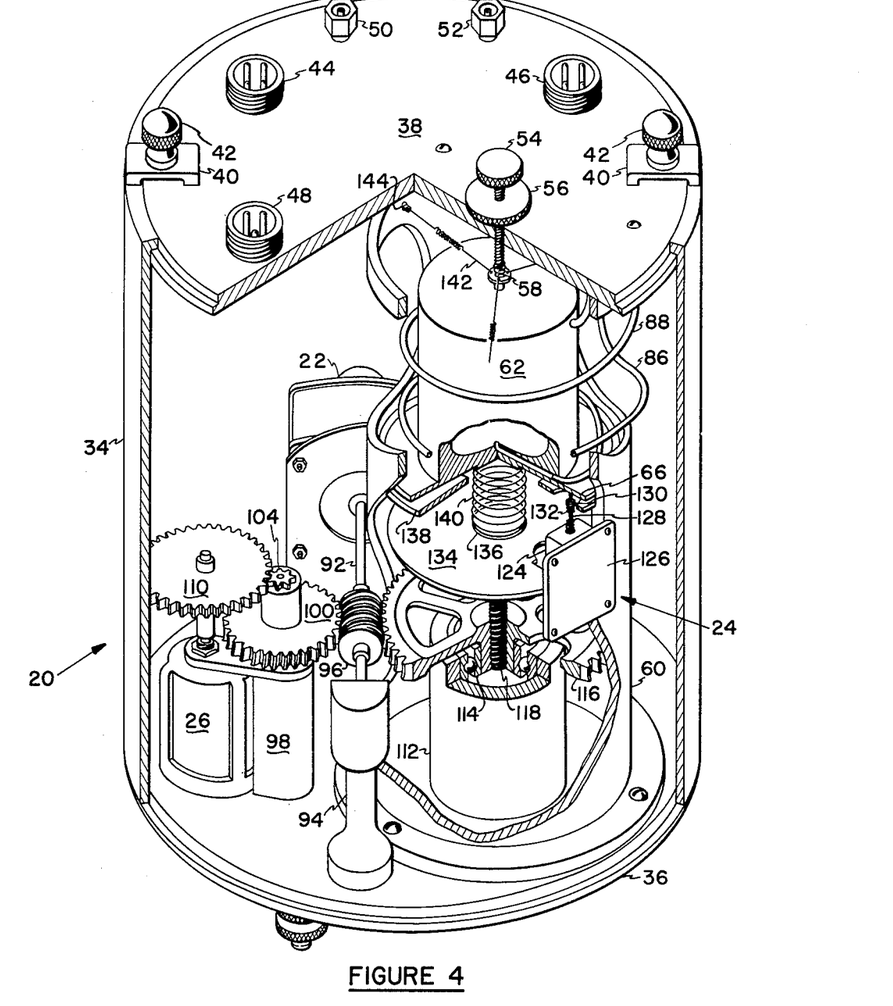
FIGURE 4 represents a perspective view from above of the weigh cell unit assembly, various parts thereof being sectioned and broken away to show details of construction, especially details of the support mechanism of the weigh cell tank.

Referring next to FIGURES 2, 3, and 4, the weigh cell unit assembly 20 is provided with an outer shell 34 which seats at its lower edge upon base plate 36. At its upper edge, shell member 34 is internally flanged and fits closely to the shouldered periphery of cover plate 38. When installed, the shell member is secured by two clamps such as 40 which bear upon its flanged upper edge and upon the cover plate, and on which downward force is exerted by knurled nuts such as 42 which are threaded onto studs (not shown) extending upwardly from cover plate 38 through clear holes in the clamps. Amphenol connectors for the wiring to induction motor 22, strain transducer 24, and helical potentiometer 26 are designated 44, 46, and 48 respectively. The tubing connector wherethrough liquids to be weighed are introduced into and withdrawn from the weigh cell is designated 50, while it is through connector 52 that the cell may be evacuated or pressurized. It may be noted presently that there is a knurl-headed screw 54 which is threaded into and extends downwardly through cover plate 38, and is provided with a knurled lock nut 56. It may be noted further that there is a small coil spring 58 extending downwardly from the lower end of this screw. The function of screw 54, lock nut 56, and spring 58 will be more completely described subsequently.

Cover plate 38 is held in spaced relation to base plate 36 by tank support column 60. This column is in the form of a cylindrical sleeve, outwardly flanged at the bottom and provided with lateral access apertures substantially as shown. Shown within support column 60 is the weigh cell tank 62. This tank is essentially cylindrical in form. It is characterized exteriorly by a lower boss 64, a lower flange 66, and an upper boss 68 which is itself flanged. It is characterized interiorly by passages 70 and 72 which lead respectively to the bottom and top of the internal space 74 of the tank. In one weigh cell unit actually constructed having a tank of the general form and proportions of tank 62, internal space 74 has a volume of about 100 milliliters. As a further detail of weigh cell tank 62, it should be noted that in the flange of upper boss 68 there are at least three small holes such as 76 having substantially regular circumferential spacing. The utility of these holes as well as other features of tank 62 so far mentioned will be more completely explained further on in this specification. It may be noted presently, however, that spring 58 extending from the lower tip of screw 54 bears upon the upper surface of boss 68 intermediate holes 76.

Angled tubing connectors 78 and 80 are set on the outside wall of support column 60 generally in way of tank 62, and on one side are connected by tubing runs 82 and 84 respectively to tubing connectors 50 and 52 on cover plate 38. From the other sides of angled connectors 78 and 80, coiled runs of flexible metal tubing 86 and 88 extend respectively to bottom and top internal passages 70 and 72 of tank 62, and are connected therein. Metal tubing runs 86 and 88 function not only as fluid conduits but also as springs, together exerting an appreciable upward force on tank 62, at least in the 100-milliliter size. The significance and counterbalancing of this force will be more completely explained further on in this specification.

Induction motor 22, which is functionally a balancing motor as will be shown, is supported from base plate 36 on bracket member 90. This motor is provided with an extended output shaft 92. At its end distant from the motor, this shaft is rotatably supported in a bearing fitted in bearing support post 94. Intermediate its length, shaft 92 is fixedly fitted with a worm screw 96. It should be noted that this screw is aligned with a slot or lateral access aperture in support column 60.

A gear support shaft 98 is mounted on base plate 36, and at its upper end is cut down to a neck of reduced diameter and rotatably fitted with worm gear 100 which meshes with worm screw 96. Pressed onto the hub of this gear is an adaptor cap member 102 which is fixedly fitted with a pinion 104. Contactingly adjacent gear support shaft 98, which may indeed be specially shaped on at least one lateral surface to provide an area fit against it, is helical potentiometer 26. This potentiometer may rest on base plate 36 without being secured to it. Potentiometer 26 is instead actually joined to support shaft 98 by means of a strap or bracket 106. A threaded sleeve extends a short way above the surface of the main structure of potentiometer 26 and encloses the potentiometer shaft, and strap 106 is drilled or otherwise perforated near its ends to allow it to fit over this sleeve as well as over the neck region of support shaft 98 which may also be threaded for part of its length. Strap 106 may itself be secured in place by nuts on the threaded neck of shaft 98 and threaded sleeve of potentiometer 26.

An adaptor 108 is fixedly fitted on the shaft of potentiometer 26 and carries a gear 110. This gear meshes with pinion 104. While the number of teeth on the elements of the gear train so far described are not critical, one distribution used with success in an actual reduction to practice of this invention has called for ninety-six teeth on gear 110, twelve teeth on pinion 104, and forty teeth on gear 100. A hollow cylindrical bearing bracket 112 is mounted on base plate 36 centrally within support column 60. Within and at the upper end of this bracket there is a ball bearing assembly 114, the outer race of which is fixed to the inner wall of bracket 112. The inner race of bearing assembly 114 encloses and is tightly fitted to the hub of worm gear 116. This gear meshes with worm screw 96. In keeping with the exemplary numbers of teeth suggested already for gear 110, pinion 104, and gear 100, gear 116 may be provided with eighty teeth. The hub of gear 116 is axially threaded internally to accommodate adjusting screw 118.

On the underside of base plate 36 is shown a leveling screw 120. This screw, of which at least three should be provided at substantially regular circumferential spacing around the base plate, is threaded into the base plate and is provided with a knurled collar for ease of manual adjustment. It is also provided with a knurled nut 122 for locking this adjustment once made.

Mounted on support column in an appropriate lateral aperture is the assembly of strain transducer 24. This assembly comprises an enclosure 124 within which are contained the strain-sensitive circuit elements and to which electrical connections are made, a mounting plate 126 to which enclosure 124 is affixed, an extension member 128 along which the transducer may be mechanically loaded extending upwardly from enclosure 124 and threaded at its upper end, two small nuts 130 locking against each other on the upper end of extension member 128, and a light coil spring 132 contained under a small compressive force between enclosure 124 and nuts 130 and surrounding extension member 128. The tendency of spring 132 is, therefore, to move the extension member in an upward direction.

Closely adjacent its upper end, adjusting screw 118 is provided with a collar (not shown). Upon this collar rests movable support plate 134. The uppermost part of adjusting screw 118 penetrates and extends slightly above plate 134. A round nut 136 is threaded onto this extension to clamp the movable support plate firmly between itself and the collar on the adjusting screw mentioned already. Plate 134 is somewhat smaller in diameter than the bore of support column 60, and so may be displaced freely in vertical motion within the latter member. A feature of the movable support plate is a notch (partially shown) wherein plate 134 engages enclosure 124 of strain transducer assembly 24. A portion of the edge surfaces of this notch have a close sliding fit on enclosure 24, and thus the movable support plate can have no significant rotational motion in support column 60. It is apparent, therefore, that as worm gear 116 is turned by action of motor 22, shaft 92, and worm screw 96 there will be only up or down motion of screw 118 and plate 134 depending on the direction of turning of the motor.

The tank support column 60 is not of uniform bore. It is shouldered internally just below the large lateral apertures shown in FIGURE 2. The bore of the column above this shoulder is slightly larger than the bore below it. Set on this shoulder and appearing partly cut away in FIGURE 4 is a fixed support plate 138. This plate is characterized by a fairly large central hole (at least somewhat larger than the diameter of nut 136) and by an eccentric hole. Extension member 128 of strain transducer assembly 24 passes upwardly through this eccentric hole.

At least part of the supporting force for tank 62 and any liquid in its internal space 74 is supplied by a balance spring 140. The lower end of this spring is seated around nut 136 on movable support plate 134, and at its upper end the spring is seated around lower boss 64 on tank 62. Intermediately it passes through the central hole in stationary support plate 138. Details of spring 140 may be seen with particular clarity in FIGURE 5. As well as being supported vertically, tank 62 and its contents must be stabilized laterally. Such stabilization is effected by three light spring links such as 142 which extend outwardly from holes 76 in the flange of tank upper boss 68 wherein they are engaged. These links are engaged at their outer ends in holes in flatted tip regions of screws such as 144 extending inwardly through support column 60 closely below cover plate 38.

In its range of normal working positions, weigh cell tank 62 is sustained above fixed support plate 138 so that there is no contact between this plate and lower flange 66 of the tank. It is intended however, that extension member 128 of the strain transducer will bear on the underside of tank flange 66 at all times during the operation of the cell. With these considerations in mind and assuming tank 62 to be empty of liquid, the balance of forces acting vertically on the tank will be considered. These forces consist essentially of those of gravity (tank weight), spring 58, coiled runs of metal tubing 86 and 88, coil spring 132 enclosing extension member 128 of transducer assembly 24 (to the extent that this spring force is not opposed by the strain-sensitive elements of the transducer), and balancing spring 140. The gravity force and that of spring 58 will always act downwardly on the tank, while those of springs 132 and 140 will always act upwardly. In small sizes of the weigh cell of this invention, for example those having tanks with internal volumes on the order of 100 milliliters, it is intended that tubing runs 86 and 88 together will exert an upward force which is equal to a major part of the weight of the tank.

Springs 58 and 132 will exert only minor forces on the tank in comparison with the tubing forces, that of spring 132 being very minor indeed. With tank 62 in an empty condition, the upward force exerted by balance spring 140 will be small compared with the support provided by tubing runs 86 and 88. A degree of adjustment is provided in the spring balance system by screw 54. With nut 56 backed off from cover plate 38 so that the screw will be unlocked for turning and thus may be run up and down through the cover plate, the degree of compression in spring 58 and hence its downward force on tank 62 may be decreased or increased.

The null position of the tank in the vertical sense is that one in which there is no net external force acting on the strain-sensitive elements of transducer 24. With the tank in this position, which is unique, the force exerted by spring 132 upwardly along extension member 128 will be exactly equalled and opposed by that exerted downwardly on member 128 by tank flange 66. With a null position of the tank established the upward force exerted by tubing runs 86 and 88 will be fixed, and so to maintain null balance of the tank variations in compression in spring 58 through adjustment of screw 54 can only be compensated by similar variations in compression in balance spring 140. The latter variations in turn can be achieved only by vertical displacement of movable support plate 134.

Vertical motion of support plate 134 will result from rotation one way or the other of motor shaft 92 as motor 22 is energized through servo amplifier 30 owing to momentary loading of the strain-sensitive elements of transducer 24 upon change in compression of spring 58 as this change either increases or decreases the downward force exerted on extension member 128 by tank flange 66. Rotation of motor shaft 92 will result in turning the shaft of potentiometer 26 through the train of gears intermediate these shafts. When the potentiometer shaft is rotated, the input voltage signal to recorder 32 will be varied and the pen or stylus apparatus of the recorder will be shifted accordingly.

It may be seen, therefore, that by adjustment of screw 54 a base line marking on the recorder paper may be set where desired, within limits, for zero weight of liquid in weigh cell tank 62. In many cases, such a marking will be established to coincide with a zero line pre-printed on the recorder paper. After the base line marking has been set, screw 54 may be locked with nut 56 to hold this zero adjustment. It may be seen also that by adjustment of screw 54 the amount of compression in balance spring 140 prior to introduction of liquid into tank 62 can be set within certain limits. In this way provision can be made to have the proper working range of compression available in the balance spring according to the weight of liquid expected to be introduced into the tank. Should such zero adjustment of spring compression upset a desired base line marking on the recorder paper, the latter may be restored in most instances by adjustment of the recorder itself or in the circuit elements wherethrough potentiometer 26 and recorder 32 are connected.

From time to time it may be desired to move weigh cell unit assembly 20, and when such time does come the tank 62 should be substantially secured against movement with respect to the rest of the cell structure. To effect such securing, pieces of cardboard or other suitable material are inserted between stationary support plate 138 and lower flange 66 of the tank to at least such a thickness that this flange is raised out of contact with the upper end of extension member 128 of strain transducer 24. Before raising tank 62, it may be desirable to relieve compression in spring 58. This is done by loosening nut 56 and turning screw 54 so that it moves upwardly through cover plate 38. After the tank has been raised and is resting on the cardboard, screw 54 will desirably be turned to move downwardly through the cover plate and cause spring 58 to exert an increased force on tank upper boss 68, thus holding the tank firmly against the cardboard. Lock nut 56 is then tightened against cover plate 38.

Figure 5:
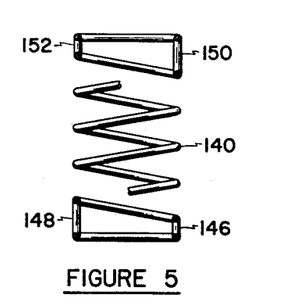
FIGURE 5 represents the balance spring whereby the weigh cell tank is immediately supported at least in part, especially showing preferable modifications to the end turns of this spring.

Referring next to FIGURE 5, the balance spring 140 is preferably modified so that the first complete helical turns on its ends provide substantially flat bearing regions to come into contact with movable support plate 134 and weigh cell tank 62. The modification is effected by applying rigid connection pieces such as 146, 148, 150, and 152 at the points where the first end turns are completed to join these turns to the turns next to them. This prevents the first two complete turns on each end of spring 140 from taking part in the compression when the spring is axially loaded, permitting only the central section of completely free turns of the spring to be so compressed. In this way, non-linearity in the relationship of spring compression to loading otherwise present due to continuous shortening of the compressible length of wire with increased force on the spring ends is substantially eliminated.

Figure 6:
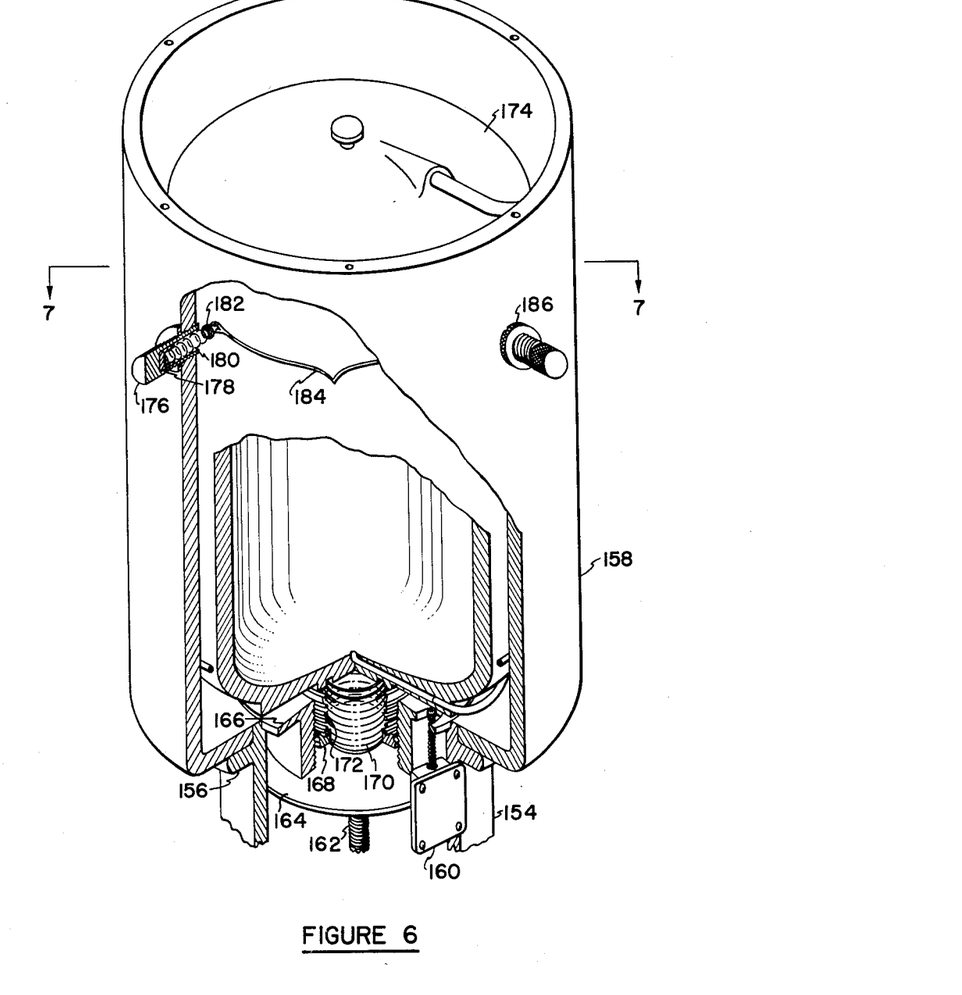
FIGURE 6 represents a perspective view from above of a modification of the weigh cell unit shown in earlier figures, various parts thereof being sectioned and broken away to show details of construction, especially details of a support mechanism for a weigh cell tank of fairly large capacity.

Referring next to FIGURE 6, which as pointed out earlier shows details of a support mechanism for a weigh cell tank of fairly large capacity, a lower tank support column 154 is provided with an outwardly-extending flange 156 near its upper end whereon is seated an upper tank support column 158 of larger bore than that of lower column 154. Mounted on lower column 154 is a strain transducer assembly 160, and shown within it are an adjusting screw 162 and a movable support plate 164. At its upper end, lower tank support column 154 is internally shouldered to provide a seat for fixed support plate 166. This plate is similar to fixed support plate 138 described already in that it has a large central hole and also an eccentric hole, the latter hole providing a clear upward passage for the extension member of the strain transducer assembly and the coil spring enclosing this member. Fixed support plate 166 differs from plate 138, however, in that it is not altogether flat but has a downwardly extending hub region of substantial length. This hub region is internally threaded as shown, and screwed into it in adjustable fashion is a tank weight adjustment spring support plate 168. The latter plate is in the general form of a flat ring which is grooved annularly in its upper surface, and which has a bore sufficiently large for clear passage of a balance spring 170.

Within the groove in spring support plate 168 there is seated a tank weight adjustment spring 172. This spring and the balance spring 170 both extend upwardly to bear against the underside of and support the weigh cell tank and its contents. The tank itself, somewhat modified from tank 62 described already, is designated 174. On its outside bottom surface it is provided with a boss having an annular groove. This groove accommodates the upper end of balance spring 170 while tank weight adjustment spring 172 is seated around the outside of the boss itself. The function of adjustment spring 172 is to counterbalance substantially all of the weight of tank 174 itself (the empty tank), allowing balance spring 170 to be sensitive to substantially only changes in weight of the tank and its contents owing to variation in the density and volume of these contents.

In the larger apparatus embodiments of this invention, those having tank capacities of 2.0 liters for example, the flexible tubing coils whereby the tank is filled or drained and pressurized or evacuated (coils corresponding to 86 and 88 in FIGURE 2) are not counted upon to supply any significant part of the force needed to support the empty tank. As aforesaid, by far the greater part of this supporting force is intended to come from adjustment spring 172, although there should be at least a slight amount of compression of balance spring 170 when the empty tank 174 is in its null balance position. Apportionment of the load of the empty tank to be carried by springs 170 and 172 respectively is effected by adjustment of spring support plate 168. Turning this plate to raise it within fixed support plate 166 increases the fraction of empty tank load carried by tank weight adjustment spring 172 and vice versa.

Lateral stability of tank 174 is provided by somewhat different means than the light spring links 142 used with tank 62. Upper tank support column 158 is drilled and tapped for three holes approximately 120° apart and at essentially the same height to accommodate externally threaded spring housings such as 176. These housings are smoothly bored for part of their length, and have externally knurled portions at their outer ends. Each housing contains a shouldered spring guide such as 178 at the closed end of its bore. Seated on these guides are light compression springs such as 180 which at their inner ends press against outer shoulders on spring clips such as 182 to hold the inner pointed sides of these clips against tank 174. The tank may be slightly indented to accommodate the points of spring clips 182.

The points of at least two adjacent clips are joined by a spring yoke such as 184 in the form of a bowed and intermediately cuspated wire or thin strip having looped or perforated ends. The function of this yoke is to provide angular stability of tank 174, and will be more fully explained in connection with FIGURE 7. Radial forces exerted by the several clips 182 against tank 174 are adjusted to hold the tank substantially central and upright in support column 158 by turning the spring housings 176 to run these housings in or out, and so tend to increase or decrease the compression of their springs 180. Once the housings are set properly, they are locked in place by means of nuts such as 186.

Figure 7:
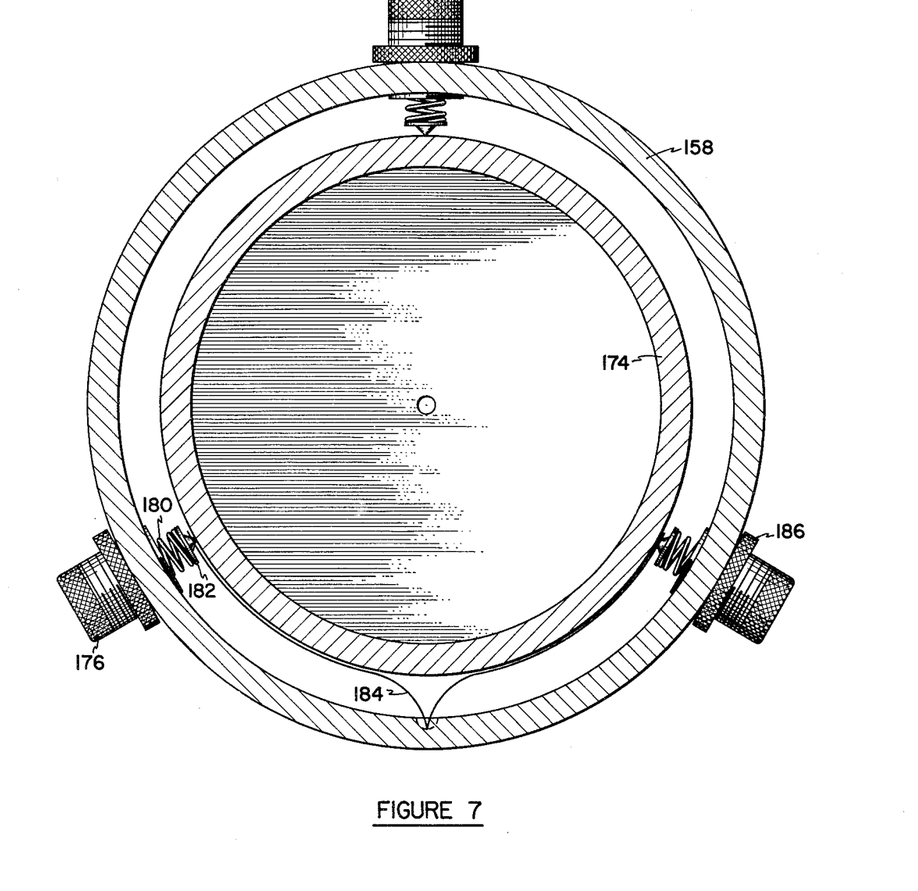
FIGURE 7 represents a sectional plan view of the weigh cell unit of FIGURE 6 on the plane of line 7—7 therein taken in the direction of the arrows, showing particularly the spring yoke installation whereby angular stability of the weigh cell tank is obtained.

Referring next to FIGURE 7, it will be seen that springs 180 may tend to be transversely unstable in the region where they are unconfined between upper tank support column 158 or the inner ends of housings 176 and tank 174 itself. Transverse upsetting of these springs might permit a certain amount of rotation of tank 174, and would in any case render the springs ineffective as means to centrally locate and laterally stabilize tank 174 in column 158. Such upsetting is prevented by means of at least one spring yoke 184, the extremities of which are looped or perforated to engage the pointed ends of two adjacent spring clips 182. At the cusp intermediate its length, yoke 184 is seated in a suitably located recess in the inner wall surface of support column 158. For as long as this yoke is so seated, there can be no transverse upsetting of the springs 180 whose clips 182 are engaged by the yoke, nor any angular movement of the tank except as the points of the clips 182 engaged by the yoke were scraped across the outer surface of the tank. With two springs 180 and the tank so stabilized, there will be little tendency for the third spring 180 to upset. Use of a single yoke 184 does not preclude the use of additional yokes if desired.

An apparatus embodiment of the liquid weigh cell of this invention and a modified version of a portion thereof having been illustrated structurally, the mode of operation and utilization of this machinery will now be considered. Referring to FIGURES 1 to 5 as a group, assume that the weigh cell unit assembly 20 is joined at connector 50 to a source of high pressure liquid such as hydrofluoric acid at about 250 p.s.i.g. used in a hydrocarbon isomerization process. This liquid will be at such temperature that it will flash to vapor if released to atmospheric pressure, and the taking of its weight as a liquid become impossible. Tank member 62 is pressurized accordingly by joining the weigh cell assembly at connector 52 to a source of inert gas such as nitrogen which is at sufficient pressure to hold the feed material to be weighed in the liquid state.

Suitable valving may be assumed to be present in the high pressure liquid feed line joined to connector 50. With this valving closed, the condition of the weight cell apparatus will be substantially as shown in FIGURE 4. Tank 62 will be in its null position almost entirely supported by tubing coils 86 and 88. Extension member 128 of strain transducer assembly 24 will be in contact at its upper end with the underside of lower flange 66 of the weigh cell tank. Two external forces (forces outside transducer enclosure 124) will be operating on this extension member. One of these, the compression force in spring 132 as it presses against nuts 130, will be acting to move the extension member up. The other of these, the very small part of the weight of tank 62 and its nitrogen gas content which is sustained by the extension member, will be acting to move member 128 down. These forces will be equal in magnitude as well as opposite in direction, and no net force will be exerted on the strain-sensitive elements within enclosure 124 of the transducer assembly 24. Consequently there will be no voltage signal from the transducer to servo amplifier 30.

At this time prior to admission of high pressure liquid up to connector 50 and thence into tank 62, balancing motor 22 will be quiescent and the slider element of helical potentiometer 26 will have some known initial position. This will provide a base line voltage signal to recorder 32, possibly one balanced out to zero voltage through the resistance network of which the potentiometer is a part or by adjustment of screw 54. In this way a reference line will be established on the recorder chart signifying the null position of the weigh cell tank member 62.

Now suppose that the valving which has heretofore blocked the high pressure liquid which is to be weighed from flowing to weigh cell 20 is opened. This liquid will flow through the piping or tubing intermediate its source and the weigh cell, through connector 50, tubing run 82, connector 78, tubing run 86, and finally begin to fill into tank 62 at the bottom displacing nitrogen gas out the top. All of the above-mentioned connectors and tubing runs will have some capacity, and this should be known. The weighing process as contemplated in the use of the present invention does not commence until all feed piping is filled with liquid, and this liquid is just about to occupy some of the internal space 74 of tank 62.

As the high pressure liquid to be weighed does begin to fill into tank 62 displacing the nitrogen, the weight of the tank and its contents will be increased, and the tank will tend to sink below its null position to compress balancing spring 140, and at the same time exert greater downward force on extension member 128 of strain transducer 24. Increased load on extension member 128 transmitted to the strain-sensitive elements of the transducer will cause imbalance of the resistance bridge therewithin. This will in turn cause an input voltage signal to be imposed on servo amplifier 30 from the transducer external circuit including battery B₁. Operating upon this signal, the servo amplifier will send differently phased currents through the two stator windings of balancing motor 22 causing rotation of the extended output shaft 92 of the motor and worm screw 96 fixed thereon.

Rotation of worm screw 96 will cause rotation of worm gear 116. Bearing in mind that adjusting screw 118 which is threaded through the hub of gear 116 is fixed to support plate 134 which may move vertically but is restrained from rotational movement by its guidance on transducer housing 124, it will be seen that as gear 116 turns it will cause raising or lowering of screw 118 and plate 134. The electrical connections from the transducer through the servo amplifier to the balancing motor will be such that in the case under consideration, that is, with the liquid load in tank 62 increasing, rotation of motor 22 will be in the direction to cause raising of adjusting screw 118 and movable support plate 134.

As the latter plate goes up it will tend to compress spring 140 from the bottom and so lift tank 62 back toward its null position. Rotation of motor 22 and raising of plate 134 will go on for as long as the weight of liquid in tank 62 is increasing, for all during that time there will be a net downward external force on extension member 128 causing an output signal from the external circuit of strain transducer 24 as aforesaid. When flow of liquid into tank 62 ceases, supposing for purposes of example that the tank has been half filled, rotation of motor 22 will almost instantaneously cease also. The tank will have been restored to its null position, and there will be no net external force on the transducer extension member 128 to provide an input signal to the servo amplifier. Spring 140 will, of course, be of a somewhat shorter compressed length than it was with the tank in its null position and initially empty of liquid.

During all the time that motor 22, shaft 92, worm screw 96, and worm gear 116 are turning to elevate screw 118 and plate 134, motion will be imparted to the slider element of helical potentiometer 26 from screw 96 through worm gear 100, pinion 104, and gear 110. As this slider element is moved, the input voltage signal to recorder 32 will be changed. With liquid weight in tank 62 increasing, the change will be in such direction to cause the recorder pencil, stylus, or other marking instrument to move across the graduations of the recorder chart in a direction to indicate this increasing weight.

At some time it will be desired to unload liquid from tank 62. This may be done, for example, by suitably venting the liquid feed line joined externally to connector 50. Nitrogen gas under pressure will then flow back into the weigh cell through connector 52, tubing run 84, connector 80, and tubing run 88, to drive liquid out of the tank at the bottom. As the weight of the tank contents is decreased, the tank will tend to rise above its null position due to the additional compression effected in spring 140 in the course of the loading operation just described. This will reduce the downward force on transducer extension member 128 exerted by the tank, and leave a net external upward force on this member exerted by spring 132.

This net force wil imbalance the transducer bridge oppositely to the imbalance on the loading cycle with the result that such a signal will reach servo amplifier 30 that this amplifier will send currents reversed in phase from those of the loading cycle through the stator coils of balancing motor 22. This motor will then turn in the direction to lower the adjusting screw 118 and movable support plate 134, thus tending to decompress spring 140, and bring tank 62 back down to its null position.

Rotation of motor 22 and lowering of plate 134 will go on for as long as the weight of liquid in tank 62 is decreasing, for during all that time there will be a net external upward force on extension member 128 causing an output signal from the external circuit of strain transducer 24. When flow of liquid out of tank 62 ceases, rotation of motor 22 will almost instantaneously cease also. The tank will have been restored to its null position, and there will be no net external force on the transducer extension member 128 to provide an input signal to servo amplifier 30.

During the lowering of plate 134 with tank 62 being unloaded of liquid, the direction of motion imposed on the slider element of helical potentiometer 26 will, of course, be reversed from its direction during the loading cycle. The voltage signal imposed on recorder 32 will, therefore, be changed to cause the marking instrument of the recorder to move across the recorder chart in a direction to indicate decrease in weight of the tank contents.

It may be noted here that whereas in the operations just described a positive pressure has been assumed to be exerted in the tank space 74 by nitrogen gas, this simply is indicative of one mode of utilization of the illustrated apparatus embodiment of this invention. In another mode, depending on the liquid to be weighed, connector 52 might be vented to the atmosphere, and in still another it might be joined to a vacuum line.

Referring next to the apparatus embodiment of this invention shown in FIGURES 6 and 7, the operation of this machinery is precisely the same as that of the equipment shown in FIGURES 1 to 5 so far as continuous return to a null position of tank 174 is concerned in the course of either loading liquid into the tank or withdrawing it therefrom. The function of tank weight adjustment spring 172, as hereinbefore stated, is to counterbalance at least the greater part of the weight of the empty tank 174 itself. The amount of load carried initially by spring 172 will depend, as noted earlier herein, on the vertical adjustment of tank weight adjustment spring support plate 168 in the hub of fixed support plate 166. Once this adjustment is set, and the null setting of all other moving parts established, the supporting force for liquid material in tank 174 with the tank returned to its null position will be furnished entirely by compression of balancing spring 170.

Brief consideration will now be given to actual reductions to practice of this invention, and to its contemplated area and scope of greatest usefulness. A weigh cell unit assembly substantially similar in appearance to that shown in FIGURE 4 has been constructed. The volume of its tank 62 is about 100 milliliters. Tests have shown this apparatus to be capable of giving liquid weight values accurate within ±0.2%. They have shown also that the apparatus operates best in regions of minimum vibration. This weigh cell was tested by measuring water into and out of its tank in order to evaluate the cell's sensitivity and precision. While the periods of load application were usually in minutes, the weigh cell was occasionally loaded for twenty-four hour periods, and showed measurement inaccuracies in this time only within the ±0.2% range above noted. It could be set to operate from 10 to 200 grams for full recorder span, and yet provide continuous precision of weight measurement.

Another weigh cell unit assembly substantially similar in appearance to that shown in FIGURE 6 has been constructed also. The volume of its tank 174 is about 2.0 liters. Tests have shown this latter apparatus to be capable of giving liquid weight values quite within the range of accuracy characteristic of the unit of 100-milliliter capacity. In taking measurements with these two weigh cells, and indeed with any others, it is to be understood that use of helical potentiometer 26 and recorder 32 is simply one possible way of ascertaining the amount of compression or decompression the balancing springs 140 and 170 undergo to nullify any change of position of the weigh cell tank due to a change of weight of the tank contents. Another way of making this measurement would be through use of a counter on the shaft of balancing motor 22, and still another would be through use of a needle mechanically connected to the motor shaft, either directly or through gearing, this needle being disposed to move across the face of a dial graduated through an appropriate weight range. Such alternate ways of making weight measurements have actually been used with the weigh cells so far constructed.

The liquid weigh cell of this invention is expected to have wide utility in chemical and petroleum pilot plant work and in the analytical laboratory. Many such uses are feasible. Some of these are: (1) use as an automatic feed and product reservoir, (2) use as a density cell, etc., for pilot units, and (3) use in distillation and titration processes, etc., in the laboratory. There is no fundamental limitation on unit size of this liquid weigh cell. It may be constructed to handle load ranges from milligrams to tons. In pilot plant work the liquid weigh cell herein disclosed may be used not only to give a highly accurate measurement of product at the end of the pilot unit run, but also to give a continuous record of product recovery all during the run. It can do this even with a product stream input pressure of several thousand pounds per square inch. This liquid weigh cell can replace any volumetric measuring equipment when the end value is desired in weight.

Although this invention has been described with a certain degree of particularity, it is to be understood that the present disclosure has been made only by way of example, especially with regard to numerical quantities given herein, and that numerous changes in the details of construction and the combination and arrangement of parts may be resorted to without departing from the spirit and scope of this invention as hereinafter claimed.

I claim as my invention:

1. An apparatus for weighing liquids, said apparatus comprising (1) a base member, (2) a support element mounted on said base member and adjustable vertically with respect thereto, (3) resilient balancing means mounted on said support element and extending thereabove, (4) a tank member located on and above said resilient balancing means, said tank member being characterized by at least one access opening wherethrough liquids to be weighed may be introduced thereinto, (5) detecting means for sensing vertical displacement of said tank member from a predetermined null balance position with respect to said base member, said detecting means being capable of generating a signal indicative of at least the direction of displacement of said tank member from said predetermined null balance position, (6) adjusting means for elevating and lowering said support element with respect to said base member responsively to signals from said detecting means, and (7) signal transmission means connecting said detecting means and said adjusting means.

2. An apparatus for weighing liquids according to claim 1 in which said adjusting means includes a servo amplifier whereto said signal transmission means are connected, a reversible electric motor characterized by an output shaft, electric power transmission means connecting said servo amplifier and said electric motor, and mechanical power transmission means connecting said support element and the output shaft of said motor.

3. An apparatus for weighing liquids according to claim 1 in which said resilient balancing means comprises at least one coil spring.

4. An apparatus for weighing liquids according to claim 1 in which said detecting means comprises a strain transducer.

5. An apparatus for weighing liquids according to claim 1 which further comprises weight indicating means, said weight indicating means being operatively connected to said adjusting means.

6. An apparatus for weighing liquids according to claim 5 in which said weight indicating means comprises a graphic recorder.

7. A liquid weigh cell, said cell comprising (1) a base member, (2) a support plate including a screw element depending therefrom mounted on said base member and adjustable vertically with respect thereto, (3) a balancing spring mounted on said support plate and extending thereabove, (4) a tank member located on and above said balancing spring, said tank member being characterized by at least one access opening wherethrough liquids to be weighed may be introduced thereinto, (5) detecting means operatively engaged with said tank member for sensing vertical displacement of said tank from a predetermined null balance position with respect to said base member, (6) an electric motor mounted on said base member, said motor being characterized by an output shaft, and (7) mechanical power transmission means connecting the screw element depending from said support plate and the output shaft of said motor.

8. A liquid weigh cell according to claim 7 in which said tank member is essentially closed, and is further characterized by at least one access opening wherethrough its interior region may be alternately pressurized and evacuated prior to introduction thereinto of liquids to be weighed.

9. A liquid weigh cell according to claim 7 in which said balancing spring comprises a coil spring, the two end turns on each end thereof being rendered essentially inflexible longitudinally with respect to each other.

10. A liquid weigh cell according to claim 7 in which said detecting means comprises a strain transducer.

11. A liquid weigh cell according to claim 10 in which said strain transducer is characterized by an extension member operatively connected to the strain-sensitive elements thereof and resilient means tending to bias said extension member longitudinally in tension.

12. A liquid weigh cell according to claim 7 which includes a potentiometer mounted on said base member, said potentiometer having a slider element and said slider element being operatively connected to the output shaft of said electric motor.

13. A liquid weigh cell, said cell comprising (1) a base member, (2) a support element mounted on said base member and adjustable vertically with respect thereto, (3) resilient balancing means mounted on said support element and extending thereabove, (4) an essentially closed tank member located on and above said resilient balancing means, (5) detecting means operatively engaged with said tank member for sensing vertical displacement of said tank from a predetermined null balance position with respect to said base member, (6) first flexible conduit means connected to said tank member wherethrough liquids to be weighed may be introduced into and removed from the interior of said tank, (7) second flexible conduit means connected to said tank member wherethrough the interior of said tank may be alternately pressurized and evacuated prior to the introduction thereinto of liquids to be weighed, (8) a column member mounted on said base member and enclosing said support element, said resilient balancing means, and said tank member, and (9) means whereby said tank member is stabilized laterally with respect to said column member.

14. A liquid weigh cell according to claim 13 in which said means whereby said tank member is stabilized laterally with respect to said column member comprises at least three tension springs, each of said tension springs extending inwardly from said column member to said tank.

15. A liquid weigh cell according to claim 13 in which said means whereby said tank member is stabilized laterally with respect to said column member comprises at least three compression springs, each of said compression springs extending inwardly from said column member to said tank.

16. A liquid weigh cell according to claim 15 which includes spring yoke means extending between at least two of said compression springs from their ends adjacent said tank member, said spring yoke means also bearing against and being engaged with the interior wall surface of said column member.

17. A liquid weigh cell, said cell comprising (1) a base member, (2) a first support element mounted on said base member and adjustable vertically with respect thereto, (3) resilient balancing means mounted on said first support element and extending thereabove, (4) a tank member located on and above said resilient balancing means, said tank member being characterized by at least one access opening wherethrough liquids to be weighed may be introduced thereinto, (5) detecting means operatively engaged with said tank member for sensing vertical displacement of said tank from a predetermined null balance position with respect to said base member, (6) a column member mounted on said base member and enclosing said first support element, said resilient balancing means, and said tank member, (7) a second support element located within said column member above the highest point of the normal range of vertical adjustment of said first support element, and (8) resilient weight adjustment means mounted on said second support element and extending thereabove into contact with said tank member, said resilient weight adjustment means being adapted to sustain substantially all of the weight of said tank member when said tank is empty of liquid and located vertically at its null balance position with respect to said base member.

18. A liquid weigh cell according to claim 17 in which said resilient weight adjustment means comprises a coil spring and in which said second support member includes a spring seat member in which the lower end of said coil spring is located, said spring seat member being adjustable vertically with respect to said base member.

19. A liquid weigh cell, said cell comprising (1) a base member, (2) a support element mounted on said base member and adjustable vertically with respect thereto, (3) resilient balancing means mounted on said support element and extending thereabove, (4) an essentially closed tank member located on and above said resilient balancing means, (5) detecting means operatively engaged with said tank member for sensing vertical displacement of said tank from a predetermined null balance position with respect to said base member, (6) first flexible conduit means connected to said tank member wherethrough liquids to be weighed may be introduced into and removed from the interior of said tank, (7) second flexible conduit means connected to said tank member wherethrough the interior of said tank may be alternately pressurized and evacuated prior to the introduction thereinto of liquids to be weighed, (8) a column member mounted on said base member and enclosing said support element, said resilient balancing means, and said tank member, (9) a cover plate mounted on said column member, (10) an adjusting screw threaded downwardly through said cover plate above said tank member and substantially in axial alignment with the line of action of said resilient balancing means, and (11) resilient means intermediate the lower end of said adjusting screw and the top surface of said tank member.

20. A liquid weigh cell according to claim 19 in which said resilient means intermediate the lower end of said adjusting screw and the top surface of said tank member comprises a coil spring, and which includes locking means for said adjusting screw.

References Cited in the file of this patent

UNITED STATES PATENTS

| 8,088 | Faber | May 13, 1851 |
|---|---|---|
| 2,472,047 | Ruge | May 31, 1949 |
| 2,746,739 | Philippovic | May 22, 1956 |
| 2,873,416 | Allen | Feb. 10, 1959 |

FOREIGN PATENTS

| 1,478 | Great Britain | 1897 |